United States Patent [19]

Ikeshita

[11] Patent Number: 5,053,897
[45] Date of Patent: Oct. 1, 1991

[54] HEAD POSITION CONTROLLING CIRCUIT FOR DISK UNIT INCLUDING SERVO HEAD SELECTION

[75] Inventor: Koji Ikeshita, Hyogo, Japan
[73] Assignee: Mitsubishi Denki K.K., Tokyo, Japan
[21] Appl. No.: 289,326
[22] Filed: Dec. 23, 1988
[51] Int. Cl.⁵ .................... G11B 5/596; G11B 21/10
[52] U.S. Cl. ............................ 360/77.05; 360/61; 360/77.04; 360/78.04
[58] Field of Search ............... 360/77.02–77.11, 360/78.04, 98.01, 98.02, 61; 369/43, 44.11, 44.25

[56] References Cited

U.S. PATENT DOCUMENTS

| | | | |
|---|---|---|---|
| 4,068,267 | 1/1978 | Inouye | 360/77.05 |
| 4,371,960 | 2/1983 | Kroiss | 369/43 |
| 4,700,244 | 10/1987 | Fasen et al. | 360/77.05 |

FOREIGN PATENT DOCUMENTS

| | | | |
|---|---|---|---|
| 56-29872 | 3/1981 | Japan | 360/77.05 |
| 59-87669 | 5/1984 | Japan | 360/77.05 |
| 61-026980 | 2/1986 | Japan | |

OTHER PUBLICATIONS

IBM TDB, vol. 17, No. 6, "Correction of Data Track Misregistration in Servo Controlled Disk Files", Paton, 11/74, pp. 1781–1783.

Primary Examiner—Vincent P. Canney
Assistant Examiner—Steven R. Garland
Attorney, Agent, or Firm—Kanesaka & Takeuchi

[57] ABSTRACT

A head position controlling circuit for a disk unit, which includes a timer for enabling periodical detection of differences of respective heads from a reference position, a memory for storing the detected differences, a reference head selected from the heads, and a device for reading the differences from the memory when a certain head is specified for access and computing a difference between differences of the specified head and the reference head for making correction to the head position.

6 Claims, 5 Drawing Sheets

HEAD POSITION CONTROLLING CIRCUIT FOR DISK UNIT INCLUDING SERVO HEAD SELECTION

BACKGROUND OF THE INVENTION

The present invention relates generally to disk units having disk-shaped storage media, such as magnetic disks useful for external storage units for computer systems or optical disks useful for document filing systems and, more particularly, to a circuit for controlling the position of a head for reading and/or writing information on each disk.

Japanese Patent Application Kokai No. 61-26980 discloses a disk unit such as shown in FIG. 3, wherein a head carriage 1 supports n arms A1-An each having a head H1-Hn at its free end. N2 of magnetic disks 3 are attached to a spindle 20 of a motor 2 for rotation in a direction shown by an arrow 4. The respective heads H1-Hn are opposed to information recording faces 5 formed on the front and back of each magnetic disk 3 for reading or writing information.

A plurality of concentric tracks are formed around the rotation center of each information recording face 5. The concentric tracks of respective magnetic disks 3 at the same position constitute a cylinder. When the heads H1-Hn access the recording faces 5, the head carriage 1 is moved in a direction shown by an arrow 6 to permit the heads to access respective tracks at the same position on the recording faces 5.

The head position controlling circuit for the above unit is shown in FIG. 4, wherein a head select circuit 8 is responsive to a head address from a host computer 9 to select one of the heads H1-Hn. When a head Hx is selected by feeding the head select circuit 8 with a head address, information may be written or read from the recording face 5 by the selected head Hx. To write information with the selected head Hx, data is given to a write circuit 11 from the host computer 9, whereas to read information with the selected head Hx, data is read out by a read circuit 12 and sent to the host computer 9.

When data is read from the magnetic disk 3 by the read circuit 12, a positioning error for the magnetic disk 3 is detected by a positioning error detecting circuit 13. This is achieved by reading servo information on each track which indicates the head position on the disk. The detected error is fed to a carriage driving circuit 14 which moves the head carriage 1 in the direction 6. Thus, the selected head Hx is positioned at the specified track on the magnetic disk 3.

However, when moved toward the spindle 20, the head carriage 1 can be inclined by an angle 7 as shown in FIG. 3. This brings about errors in respective access positions of the heads H1-Hn as shown by deviation dn. In the above patent application, correction is made by a half of the sum of two deviations of the heads H1 and Hn at opposite ends.

The correcting operation by the above circuit is shown in FIG. 5. When a cylinder address is changed, the address of a selected cylinder is fed to the carriage driving circuit 14 from the host computer 9 to seek the track of the selected cylinder address and move the head carriage 1 to the track. The lowest head H1 is then selected by the head select circuit 8, and information on the track specified by the track address is read by the head H1 and the read circuit 12. A deviation d1 from the destination track is then detected by the positioning error detecting circuit 13.

Next, the highest head Hn is selected by the head select circuit 8. Similarly, information is read by the head Hn and the read circuit 12, and a deviation dn from the destination track is detected by the positioning error detecting circuit 13. An average value d of the two deviations d1 and dn is computed, and the head carriage 1 is moved by that value for correction. Then, a head Hx is selected by the head select circuit 8 to write information on the track specified by the head address through the write circuit 11 or read information from the track specified by the head address through the read circuit 12.

Then, when another head is selected by specifying a new address without changing the cylinder address, information is similarly written in or read from the magnetic disk 3 corresponding to the selected head.

When the cylinder address is changed, on the other hand, correction is made by the average value d of two new deviations d1 and dn of the head H1 and Hn in the same way as described above.

Thus, in the disk unit of the above Patent Application, no correction is made to the head position when only the head address is changed without changing the cylinder address. That is, once the head is positioned at a certain cylinder address, no correction is made to the head position when the head address is changed at the same cylinder address, thus presenting an accuracy problem.

SUMMARY OF THE INVENTION

Accordingly, it is an object of the present invention to provide a head position controlling circuit for a disk unit, which is capable of correcting with high accuracy the head positioning error from the track to be accessed.

According to the present invention there is provided a head position controlling circuit for a disk unit, which includes a plurality of disk-shaped recording media arranged in planes spaced along a common axis of rotation, each recording medium having a plurality of concentric tracks; a plurality of heads each opposed to a recording face of each recording medium for reading information from the tracks; a carriage for collectively moving the heads toward or away from the axis of rotation; a position information detecting circuit for detecting position information which indicates a position of each track read out with the head; a positioning error detecting circuit responsive to the position information of the position information detecting circuit to detect a deviation of the head with respect to a specified track; a carriage driving circuit to move the carriage so that the deviation is minimized; a timer for enabling the positioning error detecting circuit at predetermined intervals to detect deviations of the heads with respect to specified tracks; a memory for storing the deviations of the respective heads detected by the positioning error detecting circuit; and a device provided in the carriage driving circuit for reading, when a head and a track from which data is read out are specified, from the memory, a first deviation of the specified head and a second deviation of a reference head which has been selected from the heads and feed a difference between the first and second deviations to the carriage driving circuit to move the carriage so that the difference is minimized.

The above and other objects, features, and advantages of the invention will become more apparent from the following description when taken in conjunction with the accompanying drawings.

DESCRIPTION OF THE PREFERRED EMBODIMENT

Figure 1:
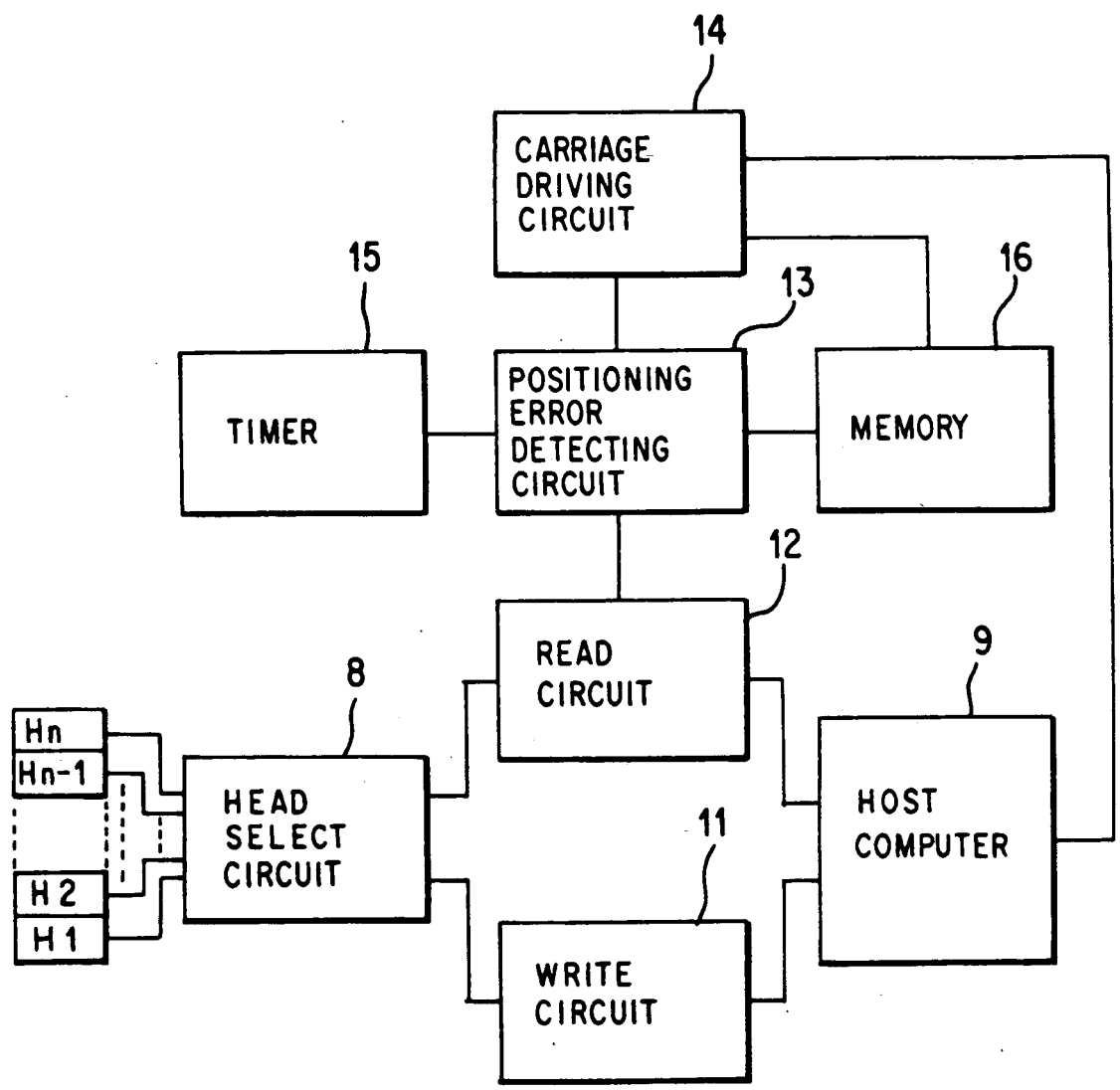
FIG. 1 is block diagram of a head position controlling circuit according to an embodiment of the present invention.
Figure 3:
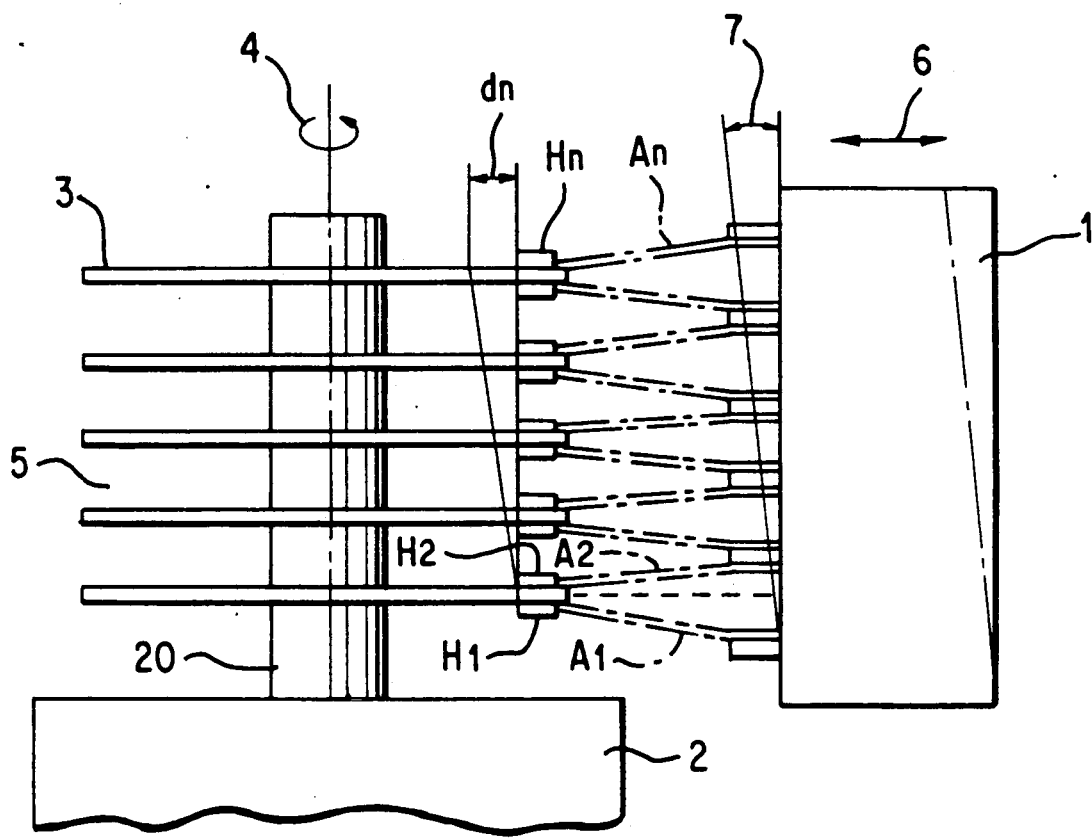
FIG. 3 is an elevational view of a disk unit to which a conventional head position controlling circuit is applied.
Figure 4:
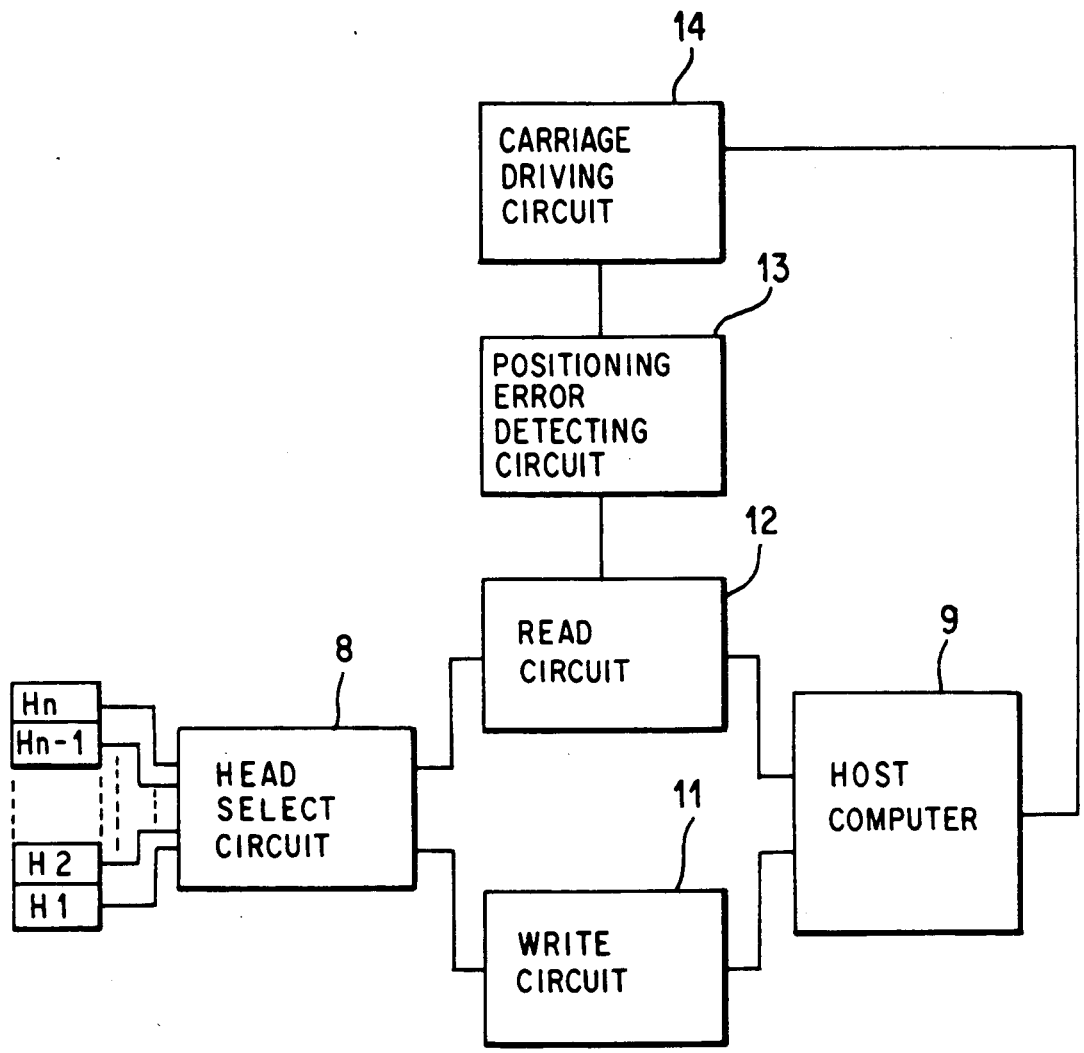
FIG. 4 is a block diagram of the above conventional circuit.
Figure 5:
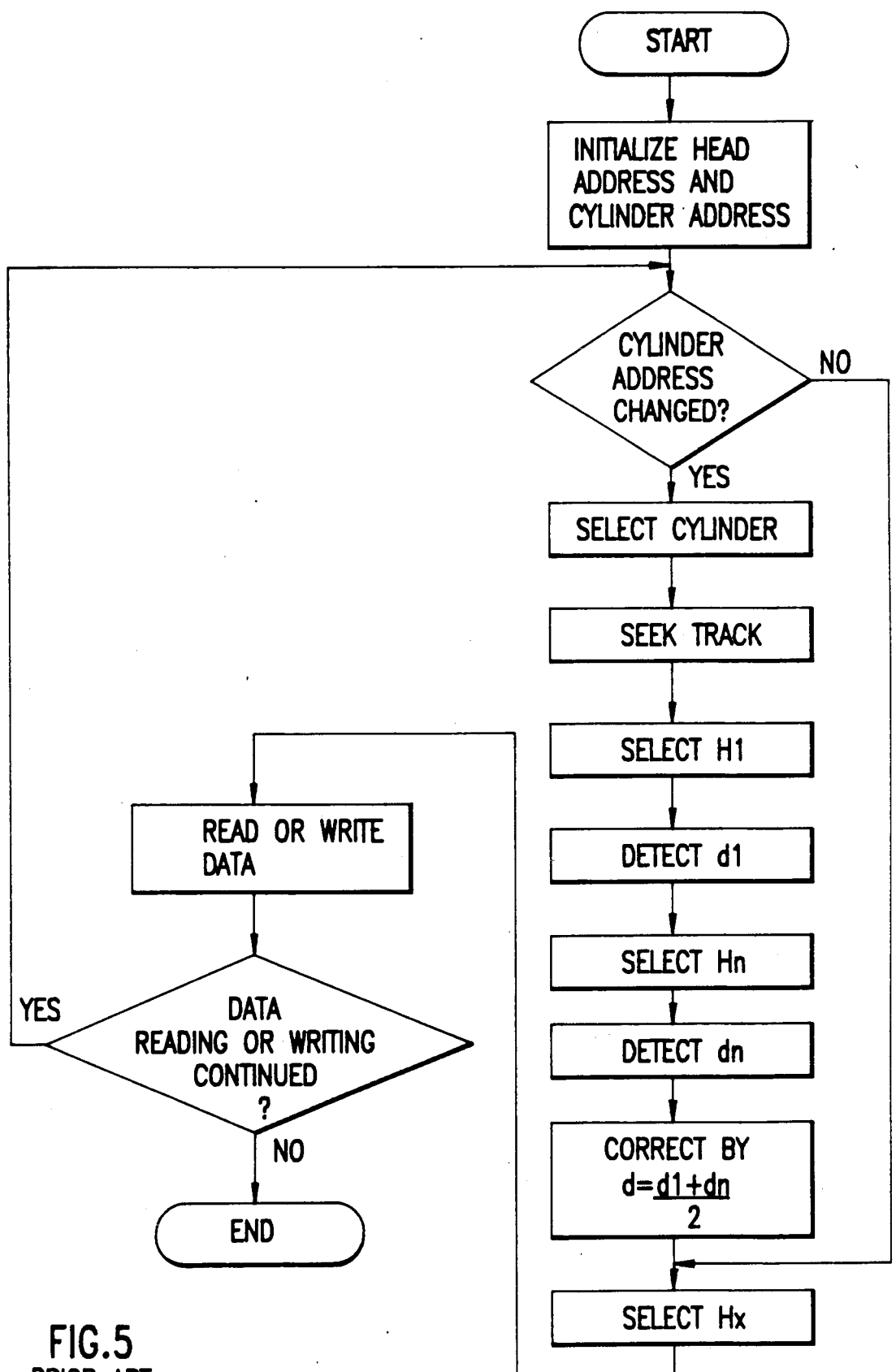
FIG. 5 is a flow chart showing the steps of operation of the above conventional circuit.

A head position controlling circuit according to the invention may be applied to a conventional disk unit such as shown in FIG. 3. In FIG. 1, all members identical with those of FIG. 4 are given the same reference numerals. In response to a head address from a host computer 9, a head select circuit 8 selects a head from a plurality of heads H1-Hn. When a Hx is selected by feeding the head select circuit 8 with a head address, information is written in or read from the recording face 5 with the selected head Hx. To write information with the selected head Hx, data is given to a write circuit 11 from the host computer 9, whereas to read information with the selected head Hx, data is read out by a read circuit 12 and sent to the host computer 9.

When data is read from the magnetic disk 3 by the read circuit 12, the position of the head Hx is detected from the data, and positioning errors d1-dn of the respective heads H1-Hn for the magnetic disks 3 are detected by a positioning error detecting circuit 13 (FIG. 1). These detected positioning errors are fed to a carriage driving circuit 14 which moves the head carriage 1 in the direction 6 according to the procedure to be described below. Thus, the selected head Hx is positioned at the specified track on the magnetic disk 3.

A timer 15 and a memory 16 for storing the results detected by the positioning error detecting circuit 13 are used for the above head position correction by the carriage driving circuit 14.

Figure 2:
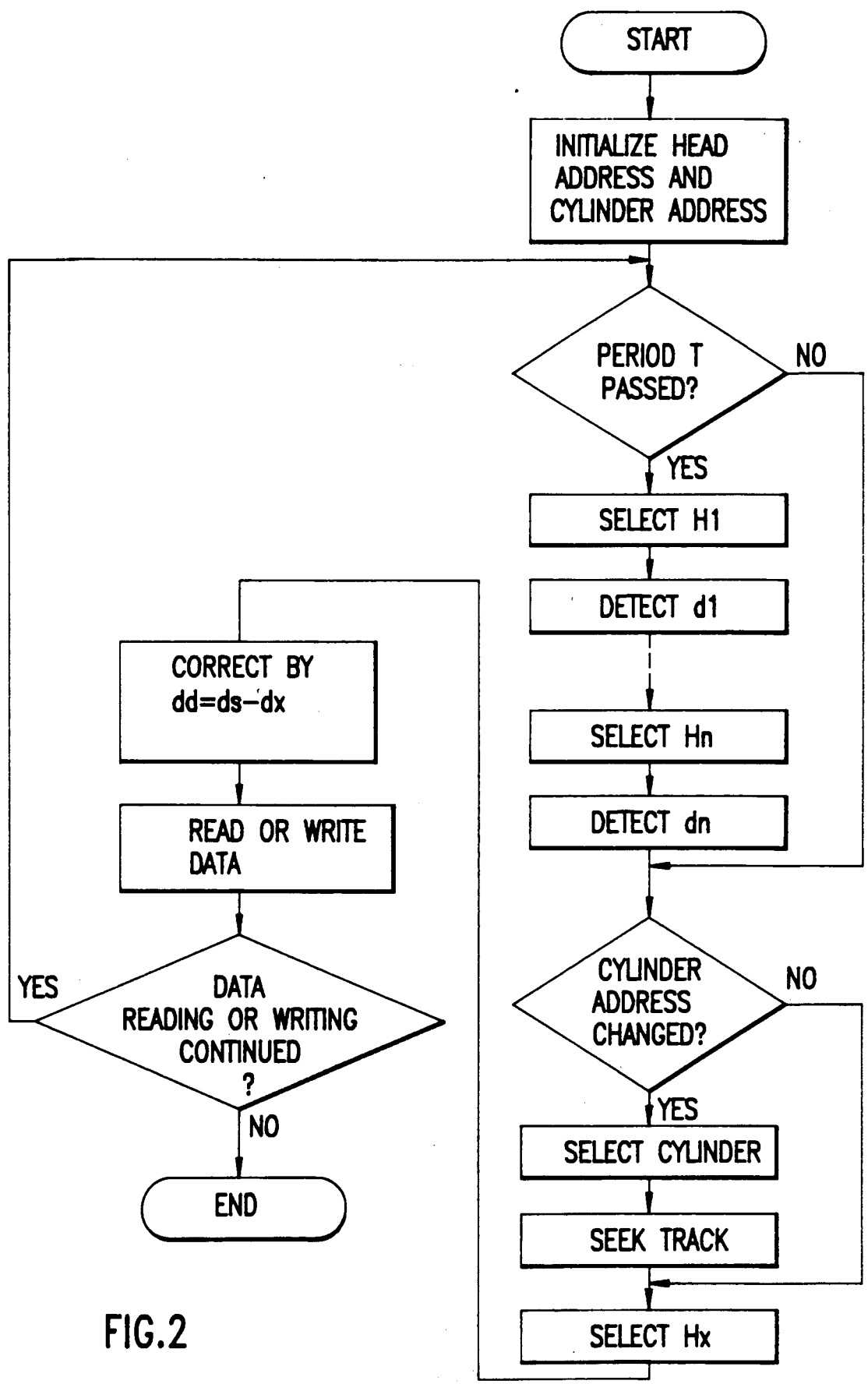
FIG. 2 is a flow chart showing the steps of operation of the above circuit.

FIG. 2 shows a flow of operation in the above head position controlling circuit, wherein one of the heads H1-Hn; e.g., the highest head, the lowest head, or the central head, has been selected as a servo head Hs which serves as a control reference.

Every time the timer 15 counts up to a certain time period T, the read circuit 12 sequentially reads servo information on the respective tracks at the same cylinder address at the time with the heads H1-Hn, and the positioning error detecting circuit 13 detects and stores in the memory 16 respective deviations d1-dn of the heads H1-Hn.

When the cylinder address is changed, a new cylinder address is fed to the carriage driving a circuit 14 from the host computer 9 to seek the track selected by the cylinder address with the servo head Hs and move the head carriage 1 to the destination track. When the host computer 9 specifies a head address, the carriage driving circuit 14 computes from data in the memory 16 a deviation difference dd ($=ds \times dx$) between a deviation ds of the servo head Hs and a deviation dx of the specified head Hx from the destination tracks and moves the head carriage 1 by that difference dd for making correction to the head position. Then, the select circuit 8 selects the head Hx at the specified head address, and the write circuit 11 of the read circuit 12 writes or reads information in or from the selected track on the corresponding magnetic disk 3.

Next, when another head is selected without changing the cylinder address, a new deviation difference dd between a deviation ds of hte servo head Hs and a deviation dx of the specified head Hx is computed for correction in the same way as described above. Thereafter, information is written or read.

When the cylinder address is changed, on the other hand, the head carriage 1 is moved to seek the track of a new cylinder address and correction is made with respect to the servo head Hs.

The head position controlling circuit according to the invention may be applied to read or write only disk units as well as read and write disk units as described above. In the head position controlling circuit of the invention, one of the heads is taken as a control reference and deviation of respective heads from the destination tracks are detected and stored in a memory at certain intervals so that when a head address is specified, correction is made by a deviation difference between the specified head deviation and the reference head deviation, whereby it is possible to make accurate correction whenever the head address is changed, thus reducing the frequency of errors which occur in reading and writing information.

While a preferred embodiment of the invention has been described using specific terms, such description is illustrative purposes only, and it is to be understood that changes and variations may be made without departing from the spirit and scope of the invention as recited in the following claims.

What is claimed is:

1. A head position controlling circuit for a disk unit, which comprises:

a plurality of disk-shaped recording media arranged in planes spaced along a common axis of rotation, each recording medium having a plurality of concentric tracks;

a plurality of heads each opposed to a recording face of each said recording medium for reading and writing information from and into said tracks;

a carriage for collectively moving said heads toward or away from said axis of rotation;

a position information detecting circuit for detecting position information which indicates a position of each track read out with each of said heads;

a positioning error detecting circuit responsive to said position information of said position information detecting circuit to detect a deviation of a head with respect to a specified track;

a carriage driving circuit to move said carriage to a specified track;

a timer for enabling said positioning error detecting circuit at predetermined intervals to detect deviations of said heads with respect to specified tracks;

a memory for storing said deviations of said respective heads detected by said positioning error detecting circuit;

means for selecting a reference head from said heads; and means provided in said carriage driving circuit for reading, when a head and a track from which data is read out are specified, from said memory, a first deviation of said specified head and a second deviation of said reference head which has been selected from said heads and feeding a difference between said first and second deviations to said carriage driving circuit to move said carriage so that said difference is minimized.

2. The head position controlling circuit of claim 1, wherein said reference head is and uppermost head among said heads.

3. The head position controlling circuit of claim 1, wherein said reference head is a central head located in the center of said heads.

4. A head position controlling circuit for a disk unit having a plurality of recording disks having servo information on each track thereon; a plurality of read/write heads; and a movable carriage for supporting said read/write heads, which comprises:
   a memory;
   a timer for generating a predetermined period of time;
   a positioning error detecting circuit connected to said timer for detecting at said predetermined period and storing in said memory deviations of said write/read heads from destination tracks;
   a head select circuit responsive to head addresses supplied from a host computer for selecting a servo head and a data head from said write/read heads; and
   a carriage driving circuit connected to said positioning error detecting circuit for computing a difference in deviation between said servo head and said data head to adjust said carriage by said difference.

5. The head position controlling circuit of claim 4, wherein said servo head is an uttermost head of said write/read heads.

6. The head position controlling circuit of claim 4, wherein said servo head is a central head of said write/read heads.

* * * * *